United States Patent
Wright et al.

[11] Patent Number: 5,896,703
[45] Date of Patent: Apr. 27, 1999

[54] POWER LIFTGATE CABLE DRIVE

[75] Inventors: Kevin W. Wright, Detroit; William L. Priest, Royal Oak; David Joseph Chapman, Sterling Heights; Howard Warren Kuhlman, Rochester Hills; Robert Wayne Baughman, Mt. Clemens; Craig R. Blanchard, Royal Oak, all of Mich.

[73] Assignee: General Motors Corporation, Detroit, Mich.

[21] Appl. No.: 09/105,317

[22] Filed: Jun. 26, 1998

[51] Int. Cl.⁶ .................................................. E05F 11/24
[52] U.S. Cl. .......................... 49/339; 49/340; 192/48.2; 296/56
[58] Field of Search ............... 49/339, 340, 341, 49/352, 348; 192/48.2, 48.92; 296/146.8, 56

[56] References Cited

U.S. PATENT DOCUMENTS

| | | | |
|---|---|---|---|
| 2,195,426 | 4/1940 | Ronning | 292/276 |
| 3,422,572 | 1/1969 | Pollak | 49/280 |
| 3,675,747 | 7/1972 | Obermark | 192/48.2 X |
| 3,713,472 | 1/1973 | Dozois | 160/189 |
| 3,735,840 | 5/1973 | Sheperd | 192/48.92 X |
| 4,739,585 | 4/1988 | Pickles | 49/280 |
| 4,851,742 | 7/1989 | Chapman | 318/286 |
| 5,448,856 | 9/1995 | Moore et al. | 49/340 |
| 5,531,498 | 7/1996 | Kowall | 296/146.4 |
| 5,588,258 | 12/1996 | Wright et al. | 49/340 |
| 5,813,282 | 9/1998 | Azuma | 192/48.92 X |

*Primary Examiner*—Jerry Redman
*Attorney, Agent, or Firm*—Charles E. Leahy

[57] ABSTRACT

A vehicle power liftgate cable drive has a cable drive housing. An electric motor with a motor housing and an output shaft is secured to the cable drive housing. A clutch pack with a first clutch driven by the output shaft and a second clutch driven by the first clutch, is mounted in the cable drive housing. One of the clutches in the clutch pack is a one way clutch and the other clutch is an electromechanical clutch. A pinion gear is driven by the second clutch. A driven gear is rotatably journaled on a fixed shaft and driven by the pinion gear. The cable drum is attached to the driven gear. A coil spring has one end fixed to the fixed shaft and its other end attached to the cable drum. The fixed shaft is rotated to preload the coil spring in a direction that tends to wind a cable on the cable drum and then the fixed shaft is fastened to the cable drive housing. A cable is attached to the cable drum and to the liftgate.

3 Claims, 8 Drawing Sheets

POWER LIFTGATE CABLE DRIVE

TECHNICAL FIELD

This invention relates to a system for opening and closing liftgates on vehicles and more particularly to a cable drive unit for taking in and letting out a cable that closes and opens a liftgate or other vehicle hatch.

BACKGROUND OF THE INVENTION

Liftgates and other doors on vans and other utility vehicles are large and heavy. Their weight is increased by windows, window wipers, defoggers and other equipment. Their hinges with a horizontal pivot axis at the top of the liftgate cause a fully open liftgate to be above the reach of many people. Power liftgate opening and closing systems are needed to reduce the effort required to manually open and close heavy liftgates. Power closing system are also needed by all but the tallest people to close liftgates that are above their reach.

A number of power systems have been proposed for opening and closing vehicle liftgates. These systems include complicated linkages in combination with a manual window crank mechanism. Such linkage systems are slow, require substantial effort to use and are unreliable.

Automotive deck lid closures with gear trains, gear racks and drive pinions have been proposed. Such systems are heavy, expensive and require a substantial amount of space.

Cable drives have been proposed for use on vehicle liftgates as well as on trunk or deck lids. These units generally have not maintained tension on the cables. When cables become slack they can get kinks, catch on cargo in the vehicle, become misrouted and have limited control over the position of open liftgates and deck lids. Manual opening and closing is at best difficult and operation during a vehicle electrical failure may be impossible.

SUMMARY OF THE INVENTION

An object of the invention is to provide a single cable liftgate opening and closing system that maintains cable tension at all time. Another object of the invention is to provide a single cable liftgate opening and closing system that is ready for manual operation any time current is shut off. A further object of the single cable liftgate opening and closing system is to provide a system that will not be damaged when the liftgate contacts an obstruction during opening or closing. A still further object of the invention is to provide a powered single cable liftgate opening and closing system that can be manually overridden at any time during operation as well as when the system is turned off.

The cable drive is driven by a permanent magnet direct current motor through a reduction gear train. The output shaft of the motor assembly drives a clutchpack with two clutches in series. One of the clutches is a one way roller clutch. The other clutch is an electromechanical clutch. As described below, the D.C. motor drives a one way roller clutch and the electromechanical clutch is driven by the one way roller clutch. The clutches could be switched so that the one way roller clutch is driven by the electromechanical clutch if desired.

A pinion gear is driven by the clutch pack. A driven gear is driven by the pinion gear. A cable drum is journaled on a fixed shaft. If further gear ratio changes are not required the cable drum is an integral part of the driven gear or is attached to the driven gear.

A coil spring is mounted inside the cable drum. The inner end of the spring is attached to the fixed shaft. The outer end of the coil spring is anchored in a groove in the inside of the cable drum. A preload is placed on the coil spring by rotating the fixed shaft in a direction that tends to wind a cable up on the cable drum and then locking the fixed shaft to the housing.

An encoder disc with apertures is integral with the pinion gear. A slotted optical sensor straddles the encoder disc and sends disc speed signals to a controller.

BRIEF DESCRIPTION OF THE DRAWINGS

The presently preferred embodiment of the invention is disclosed in the following description and in the accompanying drawings, wherein.

DESCRIPTION OF THE PREFERRED EMBODIMENT

Figure 10:
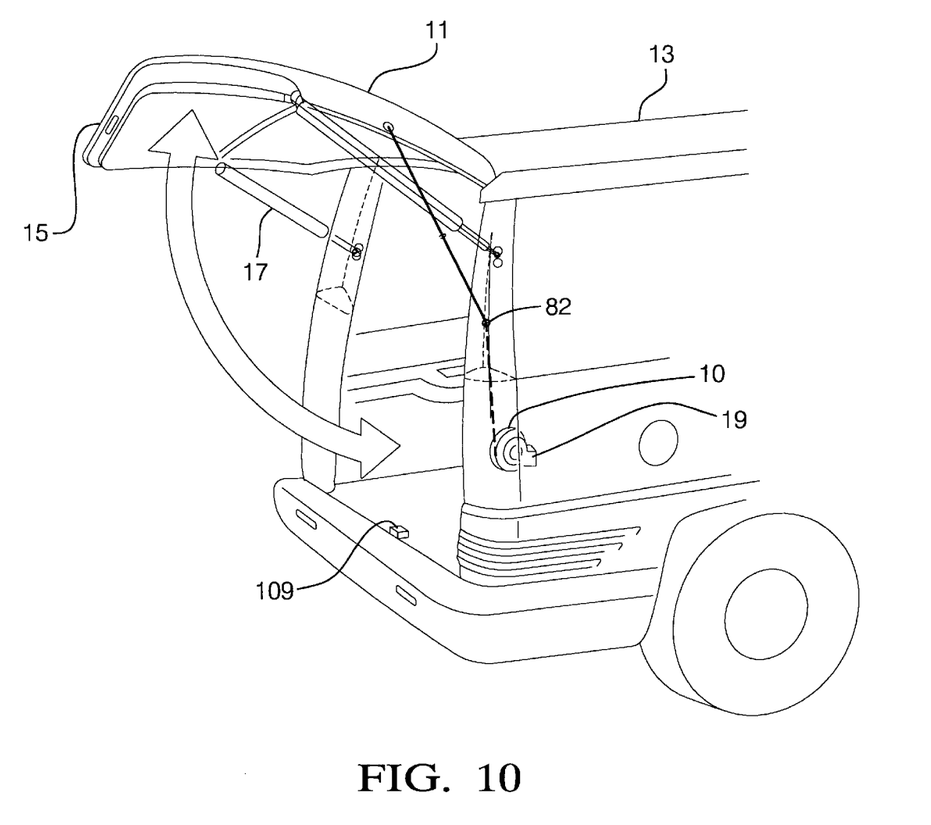
FIG. 10 is a perspective view of the rear portion of a vehicle with an open liftgate and a cable drive.

The vehicle power liftgate closing system is for opening and closing a liftgate 11 or hatch on a vehicle 13. The system includes a cable drive unit 10, a power unlatching and cinching latch 15, a counter balance system 17, an electronic controller 19 and an obstruction sensing system.

Counter balance system 17 tends to open the liftgate 11 or hatch. It is preferable that the force tending to open liftgate exceed the force required to move the liftgate by a relatively constant amount throughout the full range of movement between a closed position and a fully open position of the liftgate.

The power unlatching and cinching latch 15 is similar to latches that are used on some vehicle trunk hatches. These latches allow a hatch to be closed gently. After the hatch is closed gently, the cinching system is engaged to compress the hatch seals and hold the hatch in a closed position. Power unlatching is activated at a remote location or at the latch. Upon activation of a power unlatching system, the seals are allowed to expand and the hatch is freed to open.

The liftgate cable drive unit 10 controls the rate of movement of the liftgate as it is opened by the counter balance system 17. The cable drive unit also moves the liftgate 11 from a fully open position or any partially open position to a position in which the power unlatching and cinching latch 15 engages the liftgate 11, compresses the liftgate seals and locks the liftgate in a closed position.

The cable drive unit 10 includes a cable drive unit housing 12, a motor assembly 14, a clutch pack 16, a gear train 18, a cable drum 68, a cable 84, and a cable return spring 88. The drive unit housing 12 is a plastic material with a base 20 and a cover 21. A plurality of locking prongs 33 are provided to lock the cover 21 to the base 20. The motor assembly 14 includes a permanent magnet direct current motor 22 with a reduction gear housing 24 and an output shaft 26. Speed of the motor can be controlled by pulse width modulation of the current to the motor. The motor 22 is also reversible. The reduction gear housing 24 is connected to the base 20 of the drive unit housing 12 by mechanical fasteners.

Figure 1:
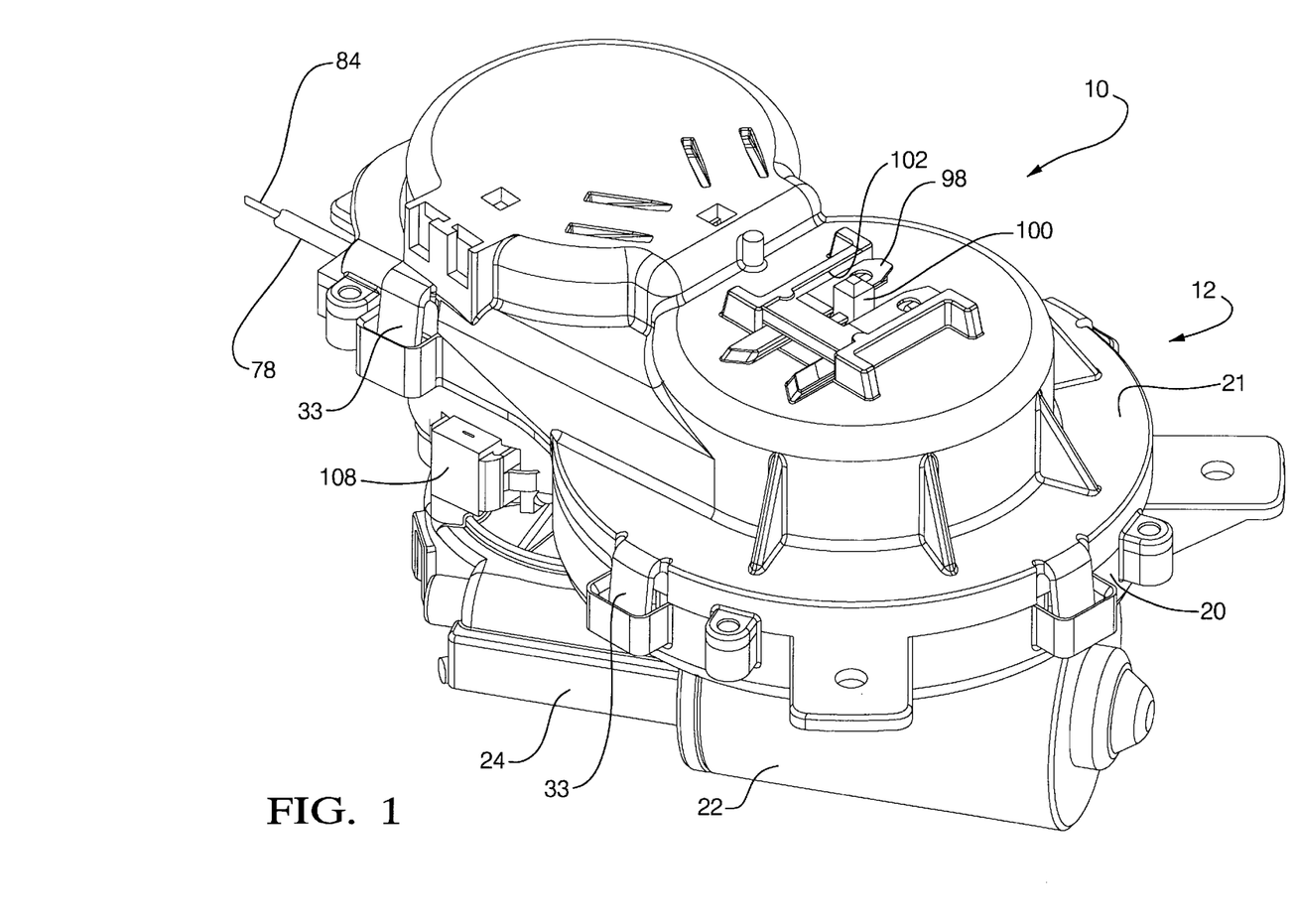
FIG. 1 is a perspective view of the cover side of the cable drive.
Figure 2:
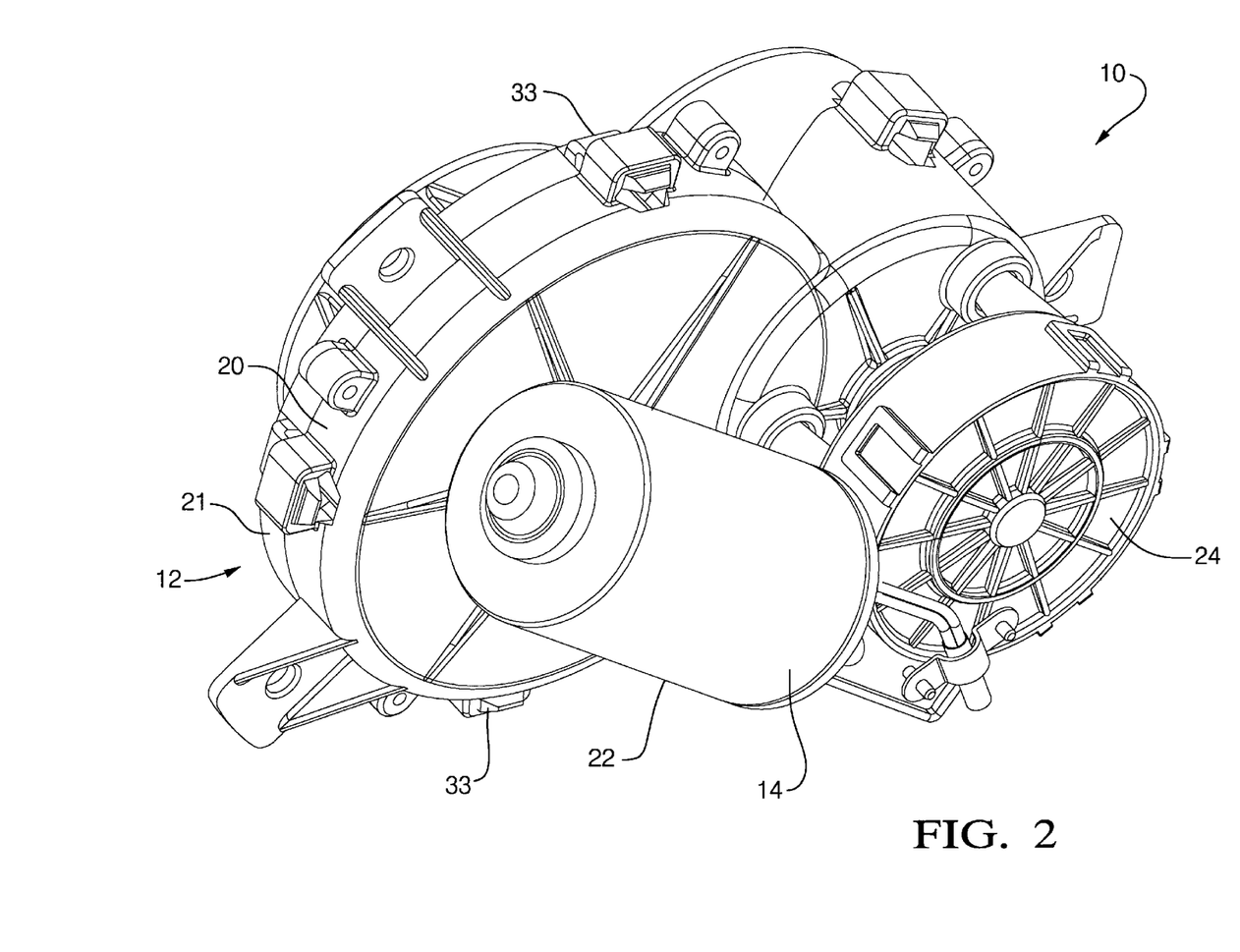
FIG. 2 is a perspective view of the base side of the cable drive.
Figure 3:
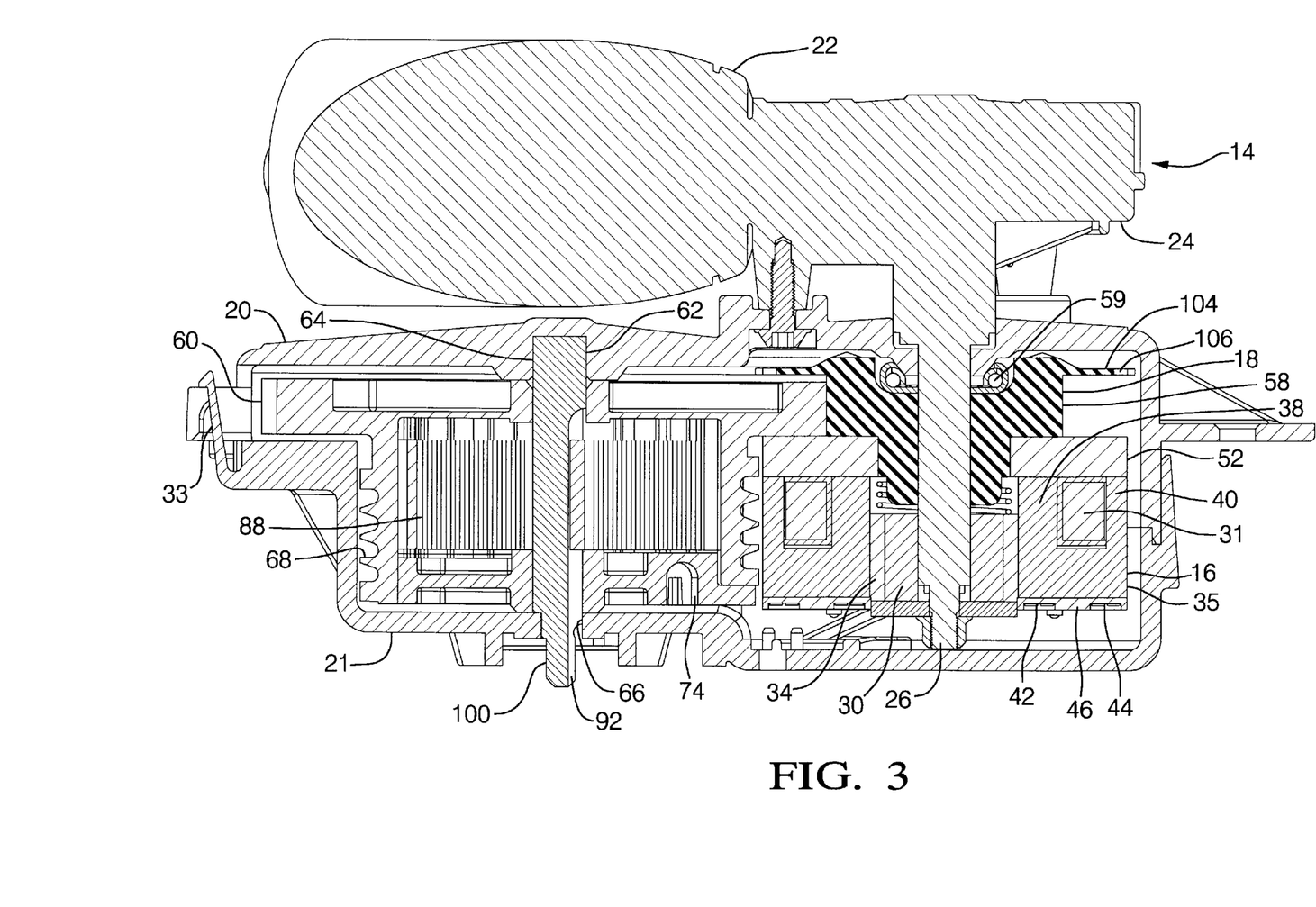
FIG. 3 is a sectional view taken in a plane through the axis of the motor assembly output shaft and through the axis of the cable drum and the fixed shaft.
Figure 4:
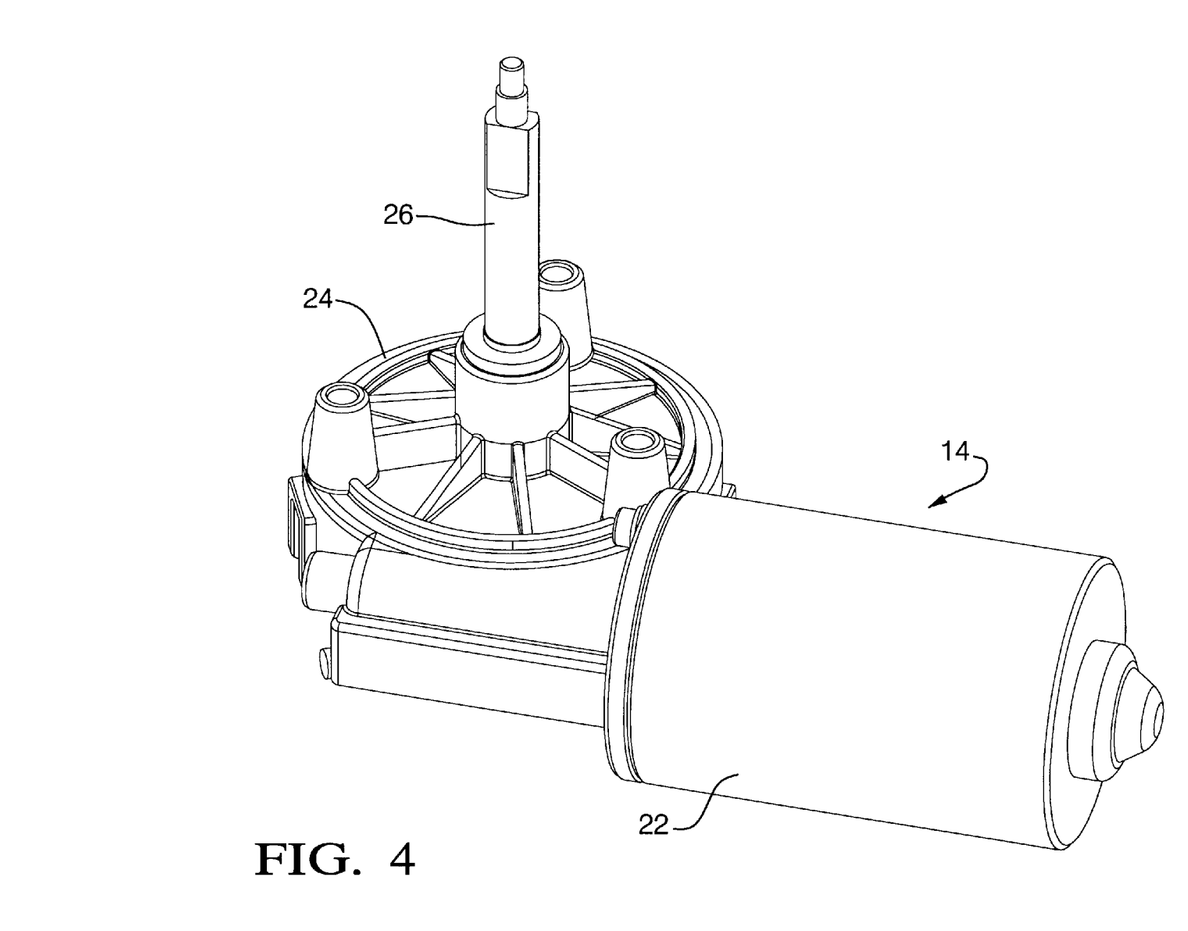
FIG. 4 is a perspective view of the motor assembly.
Figure 5:
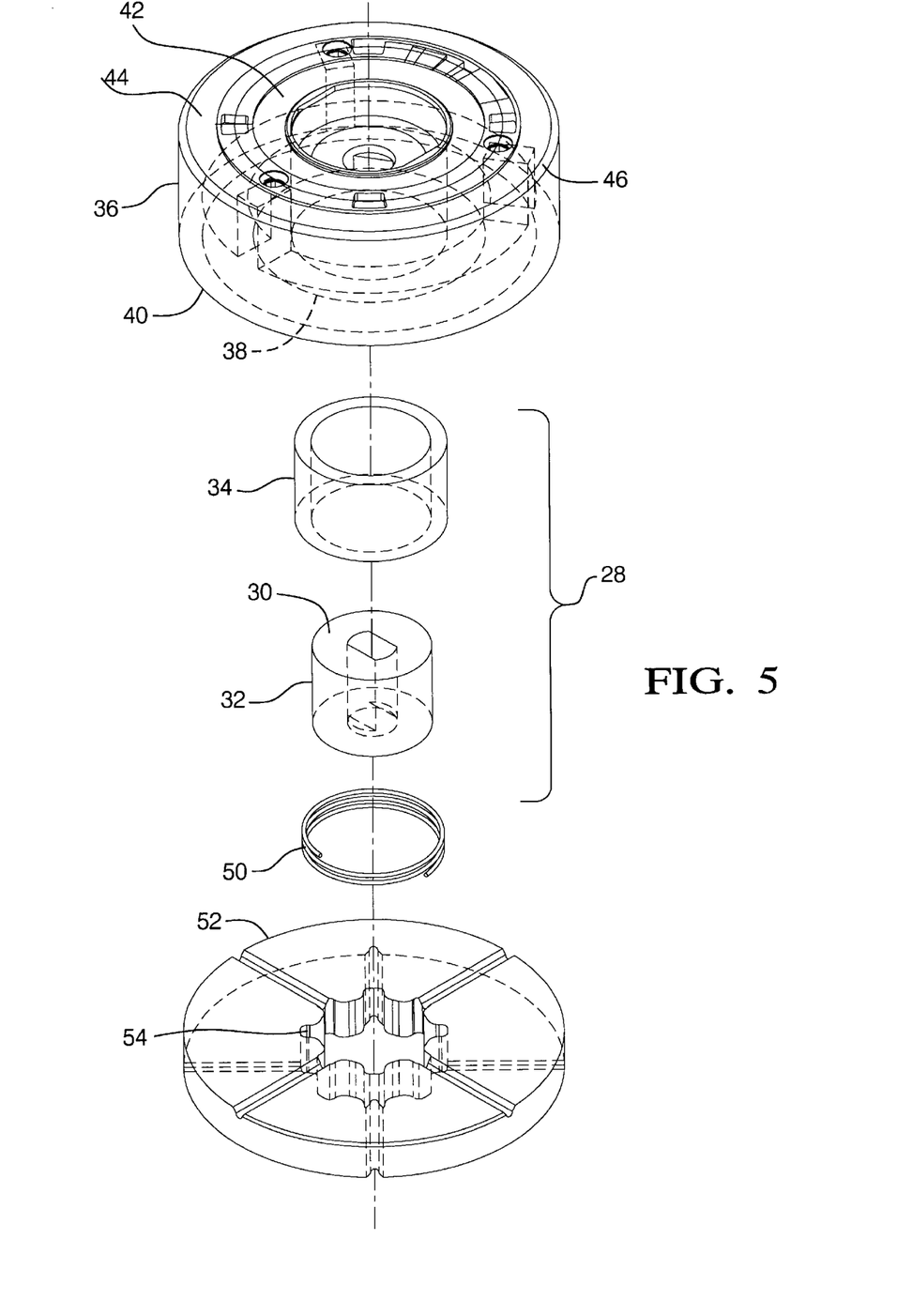
FIG. 5 is an exploded view of the clutch pack.

The clutch pack 16 includes a pair of clutches, in series with each other, that transmit torque to and from the output shaft 26. The first clutch 28 of the clutch pack 16 is an overrun clutch that transmit torque in one direction only. This first clutch 28 has a clutch shaft 30 that is mounted on the output shaft 26 of the motor assembly 14. The outer cylindrical surface 32 of the clutch shaft 30 is concentric with the output shaft 26. A roller retainer sleeve 34, with a plurality of rollers, telescopically receives the clutch shaft 30. The rollers in the sleeve 34 allows the clutch shaft 30 to rotate in one direction relation to the sleeve and locks the sleeve and the clutch shaft together to transmit torque in the other direction.

The second clutch 36 of the clutch pack 16 is an electromechanical clutch with a torodial coil 31 between two concentric tubular iron members 38 and 40. These tubular iron members are the legs of a ring shaped member 35 with a U-shaped cross section as shown in FIG. 3. The inner tubular member 38 receives the roller retainer sleeve 34. The retainer sleeve 34 is pressed into the inner tubular member 38 and both the sleeve and inner tubular member rotate together. Two electrical contact rings 42 and 44 are connected to a non-conductor 46. The non-conductor 46 separates the contact rings 42 and 44 from the ring shaped member 35. The contact rings 42 and 44 are each connected to one of the leads on the coil 31. Clutch terminals 37 and 39 each contact one of the contact rings 42 and 44 and are connected to a controller 19. A compression spring 50 is mounted between the friction plate 52 and the tubular members 38 and 40. When the coil 31 of the second clutch 36 is energized through the clutch terminals 37 and 39 and electrical contact rings 42 and 44, the friction plate 52 is drawn into contact with the tubular members 38 and 40 by the magnetic field that is created. The contact between the friction plate 52 and the tubular members 38 and 40 connects the second clutch 36 to the pinion gear 58. However, torque is transmitted between the output shaft 26 and the friction plate 52 only when the torque is in the direction which will engage the overrun clutch 28 and the second clutch 36 is energized. When current to the electrical contact rings 42 and 44 is discontinued the magnetic field is discontinued and the spring 50 disengages the friction plate 52 from the tubular members 38 and 40.

The friction plate 52 has internal splines 54 that engage external splines 56 on the pinion gear 58. The pinion gear 58 is rotatably journaled on the output shaft 26 of the motor assembly 14. A thrust bearing 59 holds the pinion gear 58 out of contact with the base 20 of the housing 12.

The pinion gear 58 meshes with the driven gear 60 that is journaled on a fixed shaft 62. The fixed shaft 62 is journaled in a bore 64 in the base 20 and a bore 66 through the cover 21 of the housing 12. The fixed shaft 62 is parallel to and offset from the output shaft 26.

Figure 6:
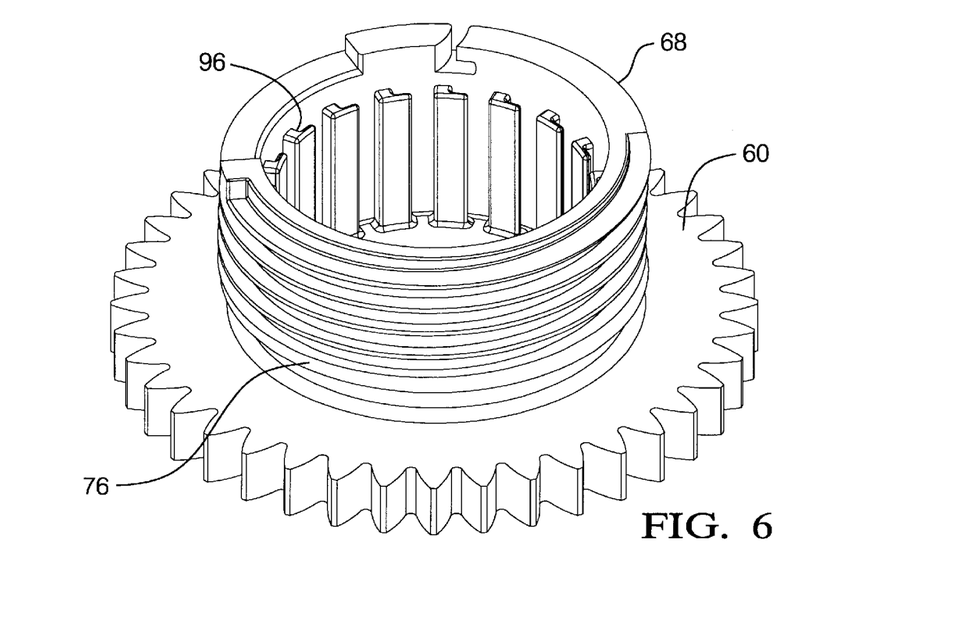
FIG. 6 is a perspective view of the driven gear and the cable drum.
Figure 9:
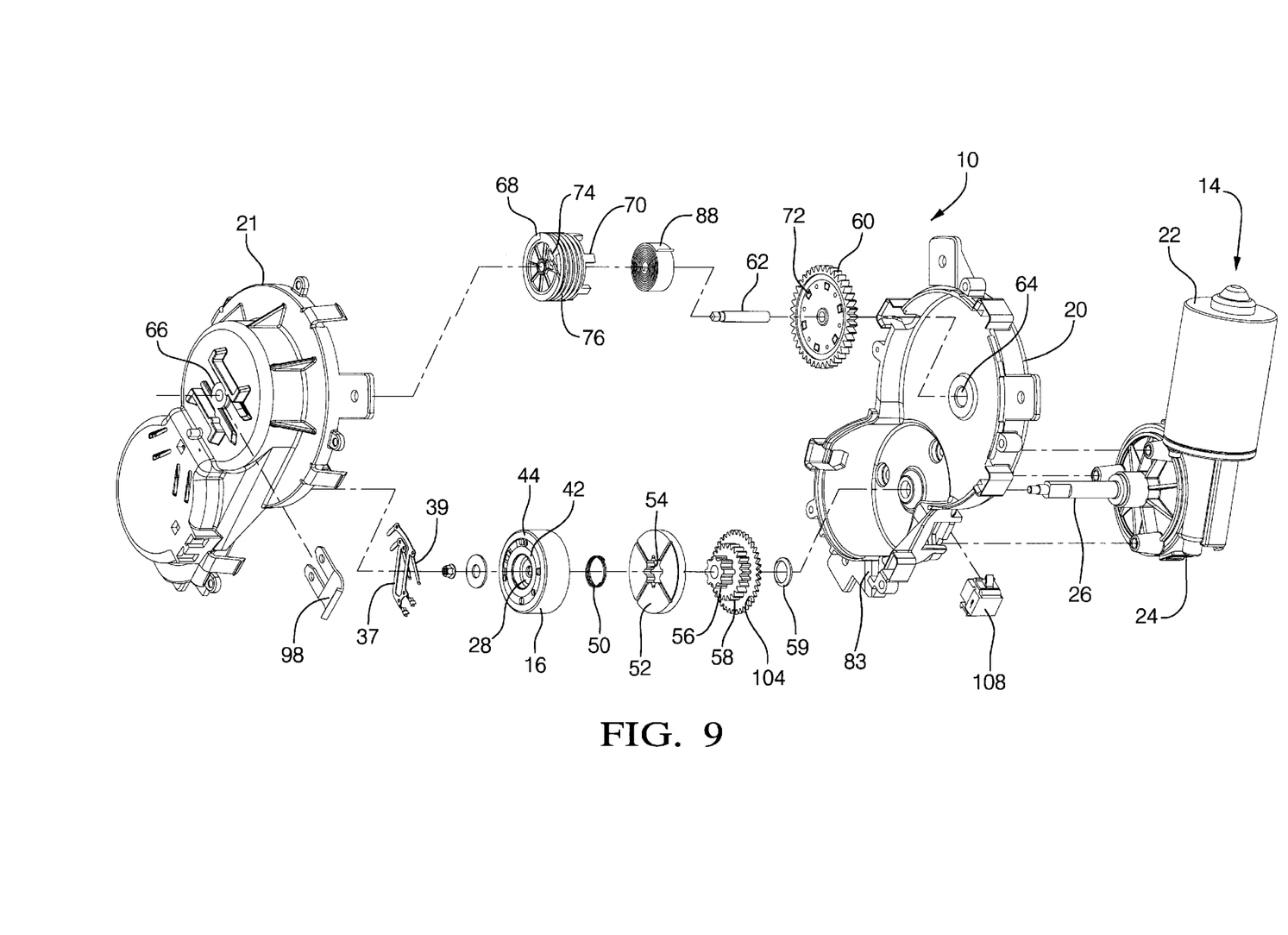
FIG. 9 is an exploded view of the cable drive unit.

The cable drum 68 as shown in FIG. 6 is integral with the driven gear 60. A cover 61 is provided to close the open end of the cable drum 68. The cable drum 68 as shown in FIG. 9 is attached to the driven gear 60 and rotates with the driven gear. A plurality of projections 70 on the cable drum 68 project into apertures 72 in the driven gear 60 and transmit torque between the driven gear and the cable drum. Both constructions of the cable drum 68 function the same. A cable anchor pocket 74 and cable grooves 76 are provided in the outer peripheral surface of the cable drum 68. The cable grooves 76 are sufficient to store cable wound on the cable drum 68 during a little more than four revolutions of the cable drum. The cable drum 68 can be enlarged if additional cable 84 is required. A cable sheath 78 may be attached to the drive unit housing 12. The cable sheath 78 extends outward to a pulley housing assembly. The pulley housing assembly is attached to the inside structure of a vehicle. A cable exit passage 82 shown in FIG. 10 is integral with the pulley housing assembly. The cable drive unit 10 is normally secured to the inside of a vehicle compartment. The cable exit passage 82 can extend to the outside of the vehicle compartment. In such arrangements, the exit passage 82 passes through a wall of the vehicle compartment and to the outside of the compartment. The exit passage 82 has dust and water seals that seal between the exit passage and a cable 84. A pulley is provided in the pulley housing assembly to accommodate a change in direction of the cable and align the cable with the exit passage 82. If a sheath 78 is not used, the cable 84 is exposed. With or without a sheath, pulleys are employed to guide the cable.

Figure 8:
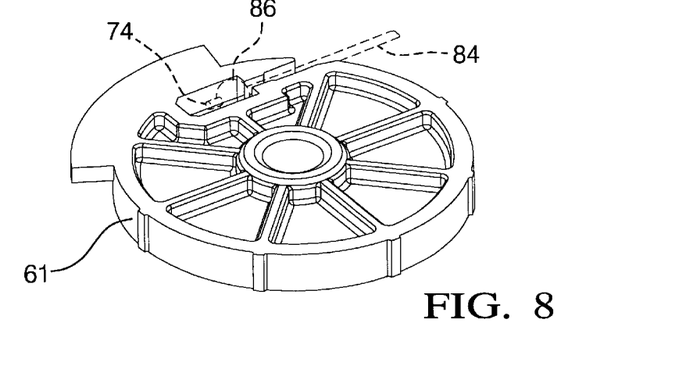
FIG. 8 is a perspective view of the cover for the cable drum shown in FIG. 6.

The cable 84 has an anchor end 86, shown in phantom in FIG. 8, that is received in the cable anchor pocket 74 in the cable drum 68. The cable 84 extends from the anchor pocket 74, into the cable grooves 76 and out of the cable drive unit housing 12 through the cable sheath 78. In installations in which a cable sheath 78 is not required, the cable 84 can pass from the drive unit housing 74 though a cable opening 83 shown in FIG. 9. Pulleys are provided as required to change the direction in which the cable 84 extends between the cable drum 68 and the liftgate 11 or other closure that is to be moved by applying tension to the cable.

Figure 7:
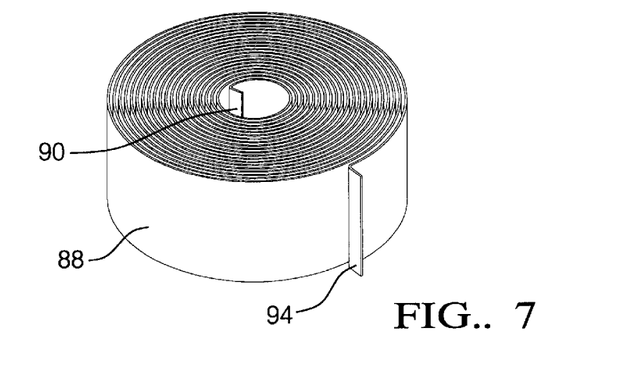
FIG. 7 is a perspective view of the cable return coil spring.

Tension is applied to the cable 84 at all times to prevent the cable from becoming misrouted, from disengaging from a pulley, from catching on something or from becoming kinked. Tension is maintained on the cable 84 by a cable return coil spring 88. An inner end 90 of the coil spring 88 is received in a slot 92 in the fixed shaft 62. The outer end 94 of the coil spring 88 engages a recess 96 in the inside of the cable drum 68. The coil spring 68 is pretensioned when the cable 84 is unwound from the cable drum 68 by rotating the fixed shaft 62, in the direction that winds cable onto the cable drum, one revolution for each rotation of the cable drum required to retract the cable plus three additional revolutions. As described above the fixed shaft 62 is rotated seven revolutions if the liftgate is open or three revolutions if the liftgate is closed and the cable 84 is wound up in the grooves 76. After the spring 88 is properly tensioned, the fixed shaft 62 is locked in a fixed position by a U-shaped clip 98 that is slid around a square end 100 of the fixed shaft 62, that extends out of the housing 12, and into a clip pocket 102 in the housing cover 21.

An interrupter plate 104 with apertures 106 is integral with the pinion gear 58. A sensor 108 is mounted on the housing 12 adjacent to the apertures 106. Movement of the apertures 106 past the sensor 108 generates a signal that is proportional to the speed of rotation of the cable drum 68. The rotational speed signal is transmitted to the controller 19.

During operation, the liftgate 11 or other hatch is closed by running the reversible motor 22 in a direction that drives the pinion gear 58, the driven gear 60 and the cable drum 68 to wrap the cable 84 in the cable gloves 76 on the cable drum. Torque from the motor 22 is transmitted through the first clutch 28 and the second clutch 36 to drive the pinion gear 58. If the liftgate is moved toward the closed position by an outside force faster than it is moved by the motor 22, the first clutch 28 will release and allow the coil spring 88 to rotate the cable drum 68 and maintain tension on the cable 84. Upon contact by the power unlatching and cinching latch with a striker 109, the motor 22 is turned off and the liftgate is cinched in a closed position. An obstruction which prevents the liftgate 11 from contacting the striker 109 will cause the interrupter or encoding disc 104 to slow. The sensor 108 detects the change in the speed of the interrupter 104 and the motor is reversed and the liftgate is opened again.

The liftgate 11 is opened by releasing the latch 15, energizing the second clutch 36 and running the motor in a direction that unwinds the cable 84 from the cable drum 68. Torque from forces urging the liftgate to an open position is transmitted to the clutch pack 16, both the first clutch 28 and the second clutch 36 are engaged and the motor 22 becomes a brake and controls the speed of movement of the liftgate 11. An obstruction that prevents the liftgate from opening releases the overrunning clutch 28. Upon release of the overrunning clutch 28, the sensor 108 senses that the interrupter 104 has stopped and the motor 22 is turned off. The second clutch 36 is also disengaged. However the controller 19 can be programmed to reclose the liftgate 11 if desired. An outside force tending to open the liftgate faster than the motor 22 allows increases the torque on the motor. The increase in torque due to an outside force trying to open the liftgate faster than permitted by the cable drive unit speeds up the pinion gear 58. The increase in the speed of the pinion gear 58 is sensed by the interrupter 104 and the sensor 108. The controller 19 is generally programmed to continue to open the liftgate 11 at the original rate. However it could disengage the second clutch 36 if desired.

The second clutch 36 is disengaged any time the cable drive unit 10 is turned off or there is a failure in the electrical system that prevents the supply of sufficient voltage to the cable drive unit 10. When the second clutch 36 is disengaged, the liftgate can be opened and closed manually. The cable 84 is pulled out and unwound from the cable drum 68 during manual opening. The cable drum 68 is rotated by the cable return spring 86 and the cable 84 is wound up during manual closing of the liftgate.

The cable 84 is preferably attached to the liftgate at a location which will minimize the change in the length of the moment arm for the force exerted by the cable 94 from the liftgate closed to the liftgate fully opened positions. Minimizing changes in the length of the moment arm will reduce changes in the force exerted by the cable 84. The reduction in changes in the force exerted by the cable 84 makes control of the drive unit more accurate.

The disclosed embodiment is representative of a presently preferred form of the invention, but is intended to be illustrative rather than definitive thereof The invention is defined in the claims.

We claim:

1. A vehicle power liftgate cable drive comprising:

an electric motor having an output shaft and a motor housing;

a clutch pack including a first clutch driven by the output shaft, a second clutch driven by the first clutch and wherein one of said first clutch and said second clutch is a one way clutch and the other of said first clutch and said second clutch is an electromechanical clutch;

a cable drum driven by the second clutch; and a cable connected to and driven by the cable drum and connected to a vehicle power liftgate.

2. A vehicle power liftgate cable drive comprising:

a cable drive housing;

an electric motor having an output shaft and a motor housing secured to the cable drive housing;

a fixed shaft rotatably supported by the housing;

a cable drum journaled on the fixed shaft and driven by the electric motor;

a spring connected to the fixed shaft and to the cable drum;

a cable connected to and driven by the cable drum and connected to a vehicle power liftgate; and a mechanical fastener connected to the cable driver housing and the fixed shaft that holds the fixed shaft in a position in which the spring biases the cable drum in a direction that urges the cable drum to rotate in a direction that coils the cable around the cable drum.

3. A vehicle power liftgate cable drive comprising:

a cable drive housing;

an electric motor having an output shaft and a motor housing secured to the cable drive housing;

a clutch pack including a first clutch driven by the output shaft, a second clutch driven by the first clutch and wherein one of said first clutch and said second clutch is a one way clutch and the other of said first clutch and said second clutch is an electromechanical clutch;

a pinion gear driven by the second clutch;

a driven gear driven by the pinion gear;

a cable drum driven by the driven gear and journaled on a fixed shaft journaled in the cable drive housing;

a spring connected to the fixed shaft and to the cable drum; and a mechanical fastener connected to the cable drive housing and the fixed shaft that holds the fixed shaft in a position in which the spring biases the cable drum in a direction that urges the cable drum to rotate in a direction that coils the coil around the cable drum; and a cable connected to and driven by the cable drum and connected to a vehicle power liftgate.

* * * * *